(12) United States Patent
Bhatti et al.

(10) Patent No.: US 9,197,448 B2
(45) Date of Patent: Nov. 24, 2015

(54) DIRECT RESPONSE AND FEEDBACK SYSTEM

(76) Inventors: Babar Mahmood Bhatti, Flower Mound, TX (US); Nizam Sayeed, Euless, TX (US); Kenneth Loafman, Plano, TX (US); Patrick N. Lawrence, Plano, TX (US)

( * ) Notice: Subject to any disclaimer, the term of this patent is extended or adjusted under 35 U.S.C. 154(b) by 38 days.

(21) Appl. No.: 13/135,929

(22) Filed: Jul. 19, 2011

(65) Prior Publication Data

US 2012/0016982 A1     Jan. 19, 2012

Related U.S. Application Data

(60) Provisional application No. 61/365,465, filed on Jul. 19, 2010.

(51) Int. Cl.
| | |
|---|---|
| *G06F 15/16* | (2006.01) |
| *G06F 15/173* | (2006.01) |
| *H04L 12/64* | (2006.01) |

(52) U.S. Cl.
CPC .................................. *H04L 12/6418* (2013.01)

(58) Field of Classification Search
CPC ... G06Q 10/10; G06Q 50/01; H04N 21/4667; H04L 12/6418
USPC .......................... 709/204, 206, 207, 224, 240
See application file for complete search history.

(56) References Cited

U.S. PATENT DOCUMENTS

| | | | | |
|---|---|---|---|---|
| 5,835,758 | A * | 11/1998 | Nochur et al. | 1/1 |
| 6,892,193 | B2 * | 5/2005 | Bolle et al. | 706/20 |
| 7,185,065 | B1 * | 2/2007 | Holtzman et al. | 709/217 |
| 7,191,223 | B1 * | 3/2007 | Zamir et al. | 709/207 |
| 7,197,502 | B2 * | 3/2007 | Feinsmith | 1/1 |
| 7,685,265 | B1 * | 3/2010 | Nguyen et al. | 709/223 |
| 7,774,421 | B2 * | 8/2010 | Dubovsky et al. | 709/206 |
| 7,849,213 | B1 * | 12/2010 | Borghetti | 709/238 |
| 8,001,105 | B2 * | 8/2011 | Bolivar et al. | 707/709 |
| 8,073,850 | B1 * | 12/2011 | Hubbard et al. | 707/736 |
| 8,135,728 | B2 * | 3/2012 | Yih et al. | 707/765 |
| 8,209,320 | B2 * | 6/2012 | Reitter et al. | 707/709 |
| 8,229,873 | B1 * | 7/2012 | Dolan et al. | 706/45 |
| 8,387,117 | B2 * | 2/2013 | Eom et al. | 726/4 |
| 2003/0233422 | A1 * | 12/2003 | Csaszar et al. | 709/206 |
| 2006/0218115 | A1 * | 9/2006 | Goodman et al. | 707/1 |
| 2006/0242139 | A1 * | 10/2006 | Butterfield et al. | 707/5 |
| 2007/0036135 | A1 * | 2/2007 | Patron et al. | 370/352 |
| 2007/0067157 | A1 * | 3/2007 | Kaku et al. | 704/10 |
| 2007/0100875 | A1 * | 5/2007 | Chi et al. | 707/102 |
| 2008/0071639 | A1 * | 3/2008 | Jacobs et al. | 705/26 |
| 2008/0154883 | A1 * | 6/2008 | Chowdhury et al. | 707/5 |
| 2009/0248806 | A1 * | 10/2009 | Teman | 709/206 |
| 2009/0282006 | A1 * | 11/2009 | Misvaer et al. | 707/3 |
| 2010/0100537 | A1 * | 4/2010 | Druzgalski et al. | 707/713 |
| 2010/0138377 | A1 * | 6/2010 | Wright et al. | 706/52 |
| 2010/0153107 | A1 * | 6/2010 | Kawai | 704/240 |
| 2010/0162135 | A1 * | 6/2010 | Wanas et al. | 715/753 |
| 2011/0320715 | A1 * | 12/2011 | Ickman et al. | 711/118 |

\* cited by examiner

*Primary Examiner* — Madhu Woolcock
(74) *Attorney, Agent, or Firm* — Steven Thrasher

(57) ABSTRACT

The invention provides methods and systems for analyzing and routing items.

6 Claims, 1 Drawing Sheet

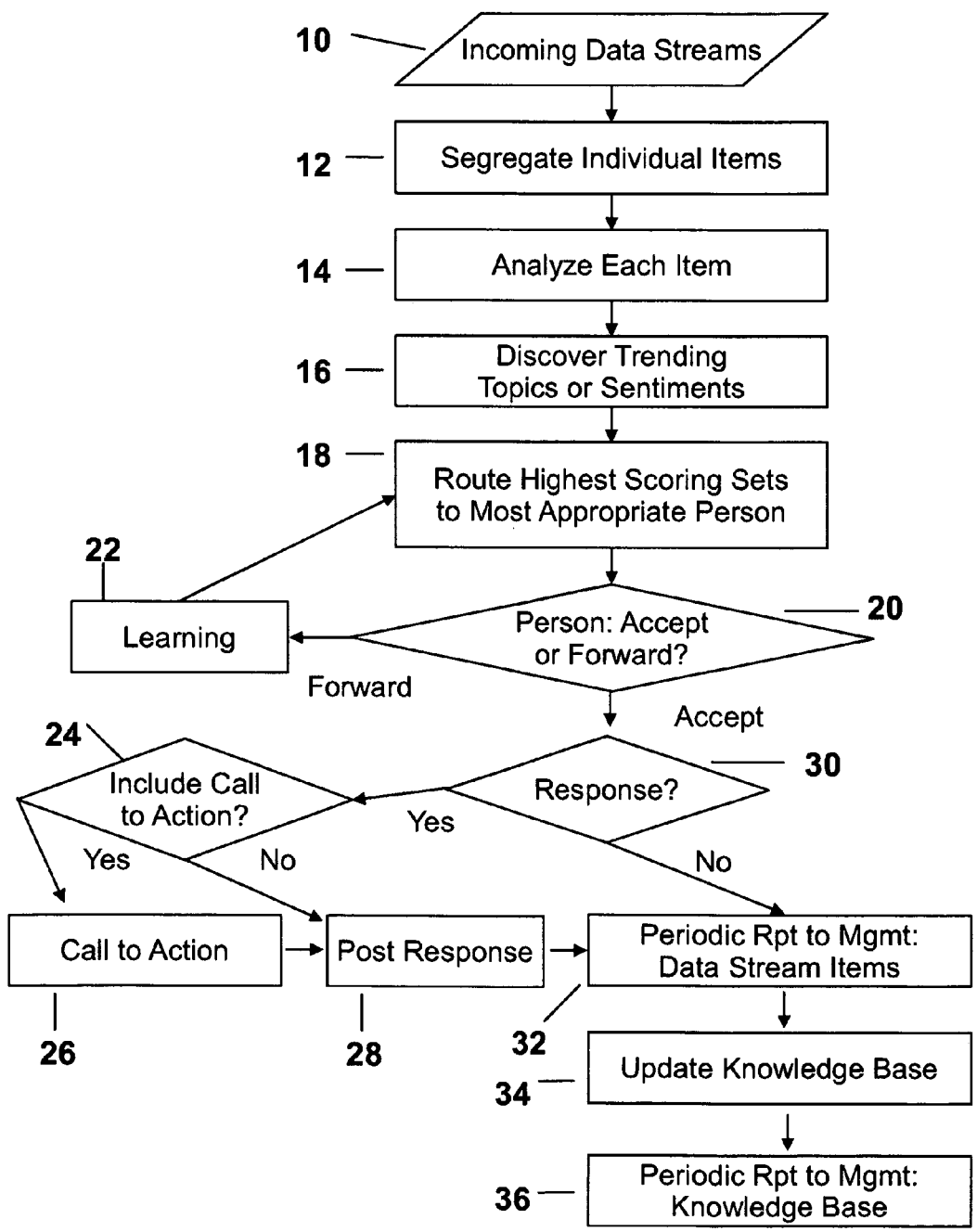

DIRECT RESPONSE AND FEEDBACK SYSTEM

CROSS-REFERENCE TO RELATED APPLICATION—CLAIM OF PRIORITY

This Application is related to and claims priority U.S. Patent Application No. 61/365,465 entitled DIRECT RESPONSE AND FEEDBACK SYSTEM which was filed on Jul. 19, 2010, which names at least Babar Bhatti as a common inventor.

STATEMENT REGARDING FEDERALLY SPONSORED RESEARCH OR DEVELOPMENT

Not applicable.

FIELD OF THE INVENTION

This invention relates generally to monitoring social media commentary.

PROBLEM STATEMENT

Interpretation Considerations

This section describes the technical field in more detail, and discusses problems encountered in the technical field. This section does not describe prior art as defined for purposes of anticipation or obviousness under 35 U.S.C. section 102 or 35 U.S.C. section 103. Thus, nothing stated in the Problem Statement is to be construed as prior art.
Discussion Definition: The term "item" herein refers to an individual element of textual information, such as an email message, a blog post, a message sent from a cell phone by means of texting, a Twitter message, or any other specific textual transmission.

Definition: The term "stream" herein refers to an aggregation of items, typically delivered by electronic means.

Definition: The term "person" refers to one or more individuals, who may also be analysts within one or more business units.

Definition: The term "recipient" herein refers to a person or persons who receives an item.

Many organizations today have a need to monitor what is being said on the many forms of social communications media that are available, such as Twitter messages, blog posts, email messages, or websites. Various well-known means exist to provide an organization with this information in the form of electronic data streams of individual messages or "items."

Individuals in an organization typically have responsibility for different subject matter areas. It is important for each item to reach an individual in the organization who is adequately prepared to handle the item. The process of routing items to of the individual who should handle it, historically that individual makes an appropriate, but purely manual response that appropriate individuals within an organization has historically been a purely manual task, where for each item, a person decides who should handle the item.

Once an item arrives in the hands may include doing nothing, writing and posting a reply to the appropriate channel, or summarizing and forwarding the processed items to organizational management. Accordingly, there exists the need for systems and methods of more efficiently distributing and managing electronic items.

BRIEF DESCRIPTION OF THE DRAWINGS

Various aspects of the invention, as well as an embodiment, are better understood by reference to the following detailed description. To better understand the invention, the detailed description should be read in conjunction with the drawings and tables, in which:

FIG. 1 illustrates an algorithm according to the teachings of the present invention.

DETAILED DESCRIPTION OF THE INVENTION

Interpretation Considerations

When reading this section (which describes an exemplary embodiment of the best mode of the invention, hereinafter "exemplary embodiment"), one should keep in mind several points. First, the following exemplary embodiment is what the inventor believes to be the best mode for practicing the invention at the time this patent was filed. Thus, since one of ordinary skill in the art may recognize from the following exemplary embodiment that substantially equivalent structures or substantially equivalent acts may be used to achieve the same results in exactly the same way, or to achieve the same results in a not dissimilar way, the following exemplary embodiment should not be interpreted as limiting the invention to one embodiment.

Likewise, individual aspects (sometimes called species) of the invention are provided as examples, and, accordingly, one of ordinary skill in the art may recognize from a following exemplary structure (or a following exemplary act) that a substantially equivalent structure or substantially equivalent act may be used to either achieve the same results in substantially the same way, or to achieve the same results in a not dissimilar way.

Accordingly, the discussion of a species (or a specific item) invokes the genus (the class of items) to which that species belongs as well as related species in that genus. Likewise, the recitation of a genus invokes the species known in the art. Furthermore, it is recognized that as technology develops, a number of additional alternatives to achieve an aspect of the invention may arise. Such advances are hereby incorporated within their respective genus, and should be recognized as being functionally equivalent or structurally equivalent to the aspect shown or described.

Second, the only essential aspects of the invention are identified by the claims. Thus, aspects of the invention, including elements, acts, functions, and relationships (shown or described) should not be interpreted as being essential unless they are explicitly described and identified as being essential. Third, a function or an act should be interpreted as incorporating all modes of doing that function or act, unless otherwise explicitly stated (for example, one recognizes that "tacking" may be done by nailing, stapling, gluing, hot gunning, riveting, etc., and so a use of the word tacking invokes stapling, gluing, etc., and all other modes of that word and similar words, such as "attaching").

Fourth, unless explicitly stated otherwise, conjunctive words (such as "or", "and", "including", or "comprising" for example) should be interpreted in the inclusive, not the exclusive, sense. Fifth, the words "means" and "step" are provided to facilitate the reader's understanding of the invention and do not mean "means" or "step" as defined in §112, paragraph 6 of 35 U.S.C., unless used as "means for—functioning—" or "step for—functioning—" in the Claims section. Sixth, the invention is also described in view of the Festo decisions, and, in that regard, the claims and the invention incorporate equivalents known, unknown, foreseeable, and unforeseeable. Seventh, the language and each word used in the invention should be given the ordinary interpretation of the language and the word, unless indicated otherwise.

Some methods of the invention may be practiced by placing the invention on a computer-readable medium, particularly control and detection/feedback methodologies. Computer-readable mediums include passive data storage, such as a random access memory (RAM) as well as semi-permanent data storage. In addition, the invention may be embodied in the RAM of a computer and effectively transform a standard computer into a new specific computing machine. Further, computing machines may be virtual computing machines, and/or "the cloud."

Data elements are organizations of data. One data element could be a simple electric signal placed on a data cable. One common and more sophisticated data element is called a packet. Other data elements could include packets with additional headers/footers/flags. Data signals comprise data, and are carried across transmission mediums and store and transport various data structures, and, thus, may be used to operate the methods of the invention. It should be noted in the following discussion that acts with like names are performed in like manners, unless otherwise stated. Of course, the foregoing discussions and definitions are provided for clarification purposes and are not limiting. Words and phrases are to be given their ordinary plain meaning unless indicated otherwise. The numerous innovative teachings of present application are described with particular reference to presently preferred embodiments.

Description Of The Drawings

The invention is a process by which individual textual information items from a stream can be analyzed to discover trending topics or sentiments and routed with reference to the item's trending topics or sentiments to a person or persons most appropriate to review the item, who may respond to the author of the item through an appropriate channel. The response may include an individual message, a possibly previously prepared generic message, and/or a survey link. Each person receiving a routed item has an option to deal immediately with the item or to forward the item to a more appropriate person. The process includes a means to learn to improve its routing by reference to the choices made by the person. The process may log activity, generate periodic reports and route those reports to management. Steps are described to accomplish the acts that accomplish the process; however, those skilled in the art will recognize that equivalent steps may exist in each case, and that changing any step to one of these equivalents does not materially alter the overall process.

FIG. 1 illustrates an algorithm according to the teachings of the present invention. The algorithm begins with a receipt of an item in an incoming data stream event 10. In the incoming data streams act 10, an organization preferably obtains a stream or streams of items from various sources, which can include commercial vendors who aggregate and forward such streams, or collection and aggregation means that the organization develops for itself. From the incoming data stream, the algorithm segregates individual items in a segregate individual items act 12, such as distinct tweets, blogs, or emails. In the segregate individual items act 12, the data streams are broken into individual items, if necessary, by exploiting the typical boundaries of each individual item, such as end-of-message marks. These segregated individual items may also be recorded to an historical database at this time for further analysis, or at later times, for example in the periodic report act 32, or in the update knowledge base act 34.

The algorithm then analyzes each item in an analyze each item act 14, and uses the data it discovers to identify trending topics or sentiments in a discover trending topics or sentiments act 16. In the analyze each item act 14, the system preferably updates a histogram with information from an item. The histogram is built from the information contained in a particular, pre-defined span of time, such as an hour or a day. The spans of two histograms may overlap or not. The system first determines the histogram(s) to which the current item applies, then updates that histogram(s). To update a histogram, the system first counts how many times each distinct word in the item appears in that item and adds that total to the count for that word in the histogram, creating a new entry in the histogram if the word has not previously been seen. It then stores the item and its association with the particular histogram. Then the system compares the current time against the definition of the time window for the histogram. Any items older than the oldest valid time for the histogram are accessed, and their words counts are subtracted from the appropriate word entries in the histogram, deleting word entries from the histogram whose counts have dropped to zero. Common "stop words," such as "a," "and," or "the" may be omitted from the histogram, if desired. A list of phrases of interest, such as a multi word product name, may be provided to the process, and if provided, the process will count the number of instances of these phrases that appear in items within the time window in a separate section of the histogram reserved for phrases. A list of words of interest, which may or may not appear in any item within the time window, may be provided to the process, and if provided, the process will count the number of instances of these words that appear within the time window. The system provides means to change these optional lists of phrases or words as desired. The histogram so produced is taken to be the definition of trending topics and sentiments of items for the window of time to which it refers. This histogram is known as a "trend histogram."

In the discover trending topics or sentiments act 16, the system compares an item with the current trend histogram from analyze each item act 14 to determine the trending topics or sentiments of the item. To do this, the system analyzes the item to produce an "item histogram," using the same procedure followed to produce the trend histogram; however, the system produces this item histogram exclusively from the item. The system first expresses the counts in both histograms as fractions by dividing each count in a histogram by the total of the counts in that histogram. Then the system constructs a composite histogram by multiplying together the fractions of corresponding histogram entries and dividing each resulting fraction by the sum of all the resulting fractions. Any histogram entry in either histogram that is not also an entry in the other histogram is omitted. The system may be instructed to exclude any entry in the composite histogram that is smaller than some predetermined value. If so, the composite histogram is then re-normalized by dividing each of the fractions of the remaining entries by the sum of those fractions. The resulting composite histogram is the "trend estimate" for the item.

For each trending topic, the algorithm routes the highest scoring set of items, together with the scoring analysis for each item in the set, to the appropriate persons in the most relevant business groups within the company, in a rout items act 18. In the rout items act 18, at a predetermined time interval, the process updates and maintains during the interval a "routing list." Each entry in the routing list consists of a trend estimate histogram similar in structure to the one produced by the discover trending topics or sentiments act 16, and a list of persons who should receive items that match this particular trend estimate histogram. Each of these trend estimate histograms may be produced by any reasonable means, including by hand or by a process similar to the one previously discussed. Each corresponding list of persons may likewise be produced by any reasonable means, including by hand or by machine learning techniques such as those described in the learning act 22. The process compares the trend estimate for each item against this routing list and obtains the routing list entry that exhibits the best match between the item's trend estimate and the list entry's trend estimate. The system evaluates matches by comparing the trend estimate of the item with the trend estimate of the routing list entry. To do this, the system constructs a score. The largest resulting score is evaluated to be the best match. The system constructs the score for a particular routing list entry, for example, by multiplying the elements of the trend estimate for the item with the corresponding elements of the trend estimate for the particular entry, and summing the resulting products. The routing list entry that produces the largest sum by this method is the best match. Many appropriate methods to accomplish this type of scoring are well known, and any of them may be employed. The process then routes the item to the person(s) in the routing table for the winning routing list entry.

In a person query 20, if a recipient decides that the item should go to another person, the algorithm forwards the item to that person, and the algorithm logs the item in order to learn from this decision to improve its routing in a learning act 22. This can be accomplished via email, text, SMS, MMS, push notifications, or any other appropriate transfer mechanism. In the learning act 22, the algorithm is automatically notified of all forwarded sets, specifically who sent them and who received them. This information is analyzed using data mining algorithms to improve future routing by updating the routing list. In one embodiment, the algorithm develops a probability or measure that the set should be forwarded to any particular company unit or individual. Preferred techniques include support vectors machines, naïve Bayesian classifiers, back propagation neural networks, and similar capabilities. Techniques can specifically include a routing list that is partially or entirely created and maintained by human beings. The routing list is preferably built and maintained to determine who should receive particular trending topics or sentiments. Further, the routing portion of this system can take advantage of the routing table.

If the item is not forwarded, the algorithm proceeds to a response query 30. In the response query 30, the system provides the opportunity for the recipient of the item to respond to the originator of the item. This is preferably done by providing choices that are familiar to those skilled in the art of communications programming to write and send a message from the recipient to the originator. Such options include such things as an Internet form that can be filled out and edited, then caused to be sent, for example via the Internet email system, from the recipient to the originator, or any other well known and suitable method, such as providing posting a reply on a message board that can be viewed by the originator of the item, or by the public at large.

Further in the response query 30, the algorithm provides each recipient with the opportunity to post a response to each item through a channel chosen by the recipient. The algorithm may provide a means for each recipient to include a previously prepared anonymous survey link in any response.

If a response is generated via the response query 30, the algorithm advances to a include call to action query 24, which enables the user to gain more information about a particular item. Preferably, the algorithm provides the ability for an item's recipient to decide whether or not to respond to the originator of the particular item with a call to action. If the user chooses to issue a call to action the algorithm proceeds to a call to action act 26. The call to action 26 act can be implemented via the internet. For example, when the recipient clicks on an option button on his or her screen to include a survey link, this action causes a link to the web page that holds a previously prepared, on line survey to be inserted into the message to be sent to the originator. The survey may collect data anonymously from survey respondents. The system handles any other similar and appropriate call to action in a similar fashion. A call-to-action can allow an organization that uses the subject invention the opportunity to measure the effectiveness of their response.

Regardless of the decision to the call to action query 24, the algorithm then proceeds to a post response act 28 in which a response is posted to the originator or others. For example, in one embodiment, when the recipient clicks on a "send" button, similar in design and functionality to those found in many email programs, the response composed by the recipient is caused to be sent to the originator by a suitable mechanism, such as email delivery. The response can be to a single user or a group. It may include one or more delivery mechanisms, such as email or posting to an on line message board. The group may be an ad hoc group defined by the recipient at the time of posting a response. The algorithm then proceeds to a periodic report act 32.

If no response is generated via the response query 30, the algorithm may immediately proceed to generate a management report and sends it to management in the periodic report act 32. In the periodic report act 32 the algorithm produces an on-line display, often described as a "dashboard" display to enable inspection of major aspects of the ongoing operation of the system itself, including the ability to "drill down" to discover the details of any summarized data item. This management data display can include various types of reports at the direction of management.

Next, in an update act 34, the algorithm updates a knowledge base by logging and tracking preferably all activities. In the update act 34, the system collects and stores a cumulative history of all data that flows through it and all actions taken on that data. Standard data mining tools can then be used by management to analyze any aspect of historical system operation. The preferred algorithm ends with a periodic report act 36 wherein the knowledge base is analyzed to generate reports and alerts to management.

We claim:

1. A method for analyzing trending topics and sentiments of social media communications within a company and routing items over a network to appropriate recipients within the company, the method comprising:

electronically receiving, from an originator, a data stream comprising an aggregation of items, wherein the items each comprise individual elements of textual information in a social media communication;

segregating each of the items based on content of the items and recording the segregated items in a historical database;

analyzing each of the recorded items to identify trending topics or sentiments, wherein the analyzing comprising generating a trend histogram using information obtained during a pre-defined span of time, the generating of the trend histogram comprising for each textual item obtained during the pre-defined span of time:

(a) defining a word count, for each distinct word, by counting a number of times the word appears in the item;

(b) creating a new entry in the trend histogram if the word has not previously been counted;

(c) ignoring every word previously defined as a stopword;
(d) comparing a current time against the pre-defined span of time for the trend histogram and accessing any items older than the pre-defined span of time;
(e) subtracting a word count for the accessed items older than the pre-defined span of time from an appropriate word count defined for the trend histogram;
(f) deleting each word from the trend histogram that has a word count dropped to zero; and
(g) counting a number of instances of predefined phrases of interest that appear in the item within the pre-defined span of time in a separate section of the trend histogram reserved for the phrases of interest;

determining the trending topics or sentiments for a particular item by:
(h) generating an item histogram by performing steps (a)-(g) exclusively for the particular item;
(i) dividing each of the word counts in the trend histogram and the word counts in the item histogram by a total word count in the respective histogram;
(j) constructing a composite histogram representing a trend estimate by multiplying together results of step (i) and dividing each resulting fraction by a sum of all the resulting fractions; and
(k) omitting any entry of the composite histogram that is smaller than a predetermined value;

scoring each of the determined topics or sentiments from each of the items;

automatically routing, over the network, a highest scoring set of the items, based on said scoring, together with an analysis of the scoring to first recipients in a relevant business group within the company, wherein the first recipients are determined by comparing the trend estimate for each item against a routing list stored in a memory consisting of recipients who should receive items that match particular trend estimates;

receiving, over the network, notification that an item of the set of items has been electronically forwarded by the first recipient to a second recipient;

automatically storing in the memory a record of the electronically forwarded item, where the record comprises at least an indication of the first recipient and the second recipient;

updating the stored routing list, based on the record, to be used in the automatic routing of subsequent items;

providing the first recipient and the second recipient with an opportunity to send a response to the originator of the data stream with a call to action, wherein the call to action provides the first recipient and the second recipient with an option button on a display screen to include a survey link, and wherein clicking the option button causes a link to a web page that holds a previously prepared online survey to be inserted into the response;

posting, over the network, the response received by the first recipient or the second recipient to the originator.

2. The method of claim 1 wherein updating the stored routing list further comprises associating the trending topics or sentiments with the second recipient.

3. The method of claim 1 wherein updating the stored routing list further comprises disassociating the trending topics or sentiments with the first recipient.

4. The method of claim 1 further comprising generating a management report comprising a dashboard display.

5. The method of claim 1 further comprising updating a knowledge database.

6. The method of claim 5 further comprising generating a management report comprising a dashboard display based on the knowledge database.

\* \* \* \* \*